United States Patent
Fukuda et al.

(10) Patent No.: US 10,432,322 B2
(45) Date of Patent: Oct. 1, 2019

(54) TRANSMISSION/RECEPTION DEVICE AND TRANSMISSION/RECEPTION METHOD

(71) Applicant: SONY CORPORATION, Tokyo (JP)

(72) Inventors: Shinichi Fukuda, Kanagawa (JP); Takanori Washiro, Tokyo (JP); Masahiro Uno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 15/779,175

(22) PCT Filed: Nov. 29, 2016

(86) PCT No.: PCT/JP2016/085286
§ 371 (c)(1),
(2) Date: May 25, 2018

(87) PCT Pub. No.: WO2017/098951
PCT Pub. Date: Jun. 15, 2017

(65) Prior Publication Data
US 2018/0351657 A1 Dec. 6, 2018

(30) Foreign Application Priority Data
Dec. 11, 2015 (JP) .................... 2015-241795

(51) Int. Cl.
*H04B 13/00* (2006.01)
*H04B 1/16* (2006.01)
*H04B 5/00* (2006.01)
(52) U.S. Cl.
CPC ......... *H04B 13/005* (2013.01); *H04B 1/1615* (2013.01); *H04B 5/0012* (2013.01)
(58) Field of Classification Search
CPC combination set(s) only.
See application file for complete search history.

(56) References Cited

U.S. PATENT DOCUMENTS 8,633,809 B2 * 1/2014 Schenk ............... H04B 13/005
340/286.01
9,325,430 B2 * 4/2016 Ino ...................... A61B 5/0024
(Continued)

FOREIGN PATENT DOCUMENTS

EP       1598965 A1    11/2005
JP    2003-037566 A    2/2003
(Continued)

OTHER PUBLICATIONS

International Search Report and Written Opinion of PCT Application No. PCT/JP2016/085286, dated Feb. 21, 2017 (Year: 2017).*
(Continued)

*Primary Examiner* — Yuwen Pan
*Assistant Examiner* — Erica L Fleming-Hall
(74) *Attorney, Agent, or Firm* — Chip Law Group

(57) ABSTRACT

The present disclosure relates to a transmission/reception device, a transmission/reception method, and a program capable of improving a transmission characteristic in human body communication in both transmission and reception. The transmission/reception device used for human body communication includes three electrodes including a human body side electrode being in contact with a human body as a communication medium, a space side electrode provided on a space side, not a human body side, and a circuit board provided with a circuit. At this time, at the time of transmission, a switch between the space side electrode and the circuit board is turned off to make a three-pole electrode configuration having superiority in the transmission characteristic, and each electrode is caused to function as an independent electrode. On the other hand, at the time of reception, the switch between the space side electrode and the circuit board is turned on to electrically short-circuit the space side electrode and the circuit board, to cause the
(Continued)

electrodes to function as a two-pole electrode configuration having superiority in the transmission characteristic. The present disclosure can be applied to a human body communication device.

8 Claims, 16 Drawing Sheets

(56) References Cited

U.S. PATENT DOCUMENTS

| | | | |
|---|---|---|---|
| 2006/0077616 A1 | 4/2006 | Takiguchi | |
| 2006/0092908 A1* | 5/2006 | Sung | H04B 13/005 370/347 |
| 2007/0050199 A1* | 3/2007 | Ishibashi | G06Q 10/02 705/5 |
| 2008/0261523 A1* | 10/2008 | Kubono | H04B 13/005 455/41.1 |
| 2009/0023387 A1* | 1/2009 | Minotani | H04B 13/005 455/41.1 |
| 2009/0137883 A1* | 5/2009 | Chiba | A61B 1/041 600/302 |
| 2009/0305641 A1* | 12/2009 | Kubono | H04B 13/005 455/67.11 |
| 2010/0136906 A1* | 6/2010 | Hwang | H04B 13/005 455/41.1 |
| 2010/0137708 A1* | 6/2010 | Tamura | A61B 1/041 600/424 |
| 2010/0234756 A1* | 9/2010 | Hyoung | H04L 12/12 600/547 |
| 2010/0237988 A1* | 9/2010 | Hachisuka | H04B 13/005 340/5.61 |
| 2011/0200150 A1* | 8/2011 | Fazzi | H04B 13/005 375/343 |
| 2011/0299512 A1* | 12/2011 | Fukuda | G06F 1/163 370/338 |
| 2012/0003929 A1* | 1/2012 | Hyoung | G06F 1/3231 455/41.1 |
| 2012/0013446 A1* | 1/2012 | Ino | A61B 5/0024 340/10.1 |
| 2014/0213184 A1* | 7/2014 | Matsubara | H04B 5/0031 455/41.1 |
| 2017/0230121 A1* | 8/2017 | Tanaka | H04B 13/005 |
| 2017/0332908 A1* | 11/2017 | Uno | G06K 19/07 |
| 2018/0262222 A1* | 9/2018 | Uno | H04B 1/10 |

FOREIGN PATENT DOCUMENTS

| | | |
|---|---|---|
| JP | 2004-282733 A | 10/2004 |
| JP | 2006-324774 A | 11/2006 |
| WO | 2004/077704 A1 | 9/2004 |
| WO | WO-2017098951 A1 * | 6/2017 ............. H04B 13/00 |
| WO | WO-2018025641 A1 * | 2/2018 ............. H04B 5/02 |

OTHER PUBLICATIONS

Hachisuka, et al., "Signal Transmission Modeling of the Intrabody Communication and Experimental Analyses", vol. 10, No. 6, 2007, pp. 462-468. (Year: 2007).*

International Search Report and Written Opinion of PCT Application No. PCT/JP2016/085286, dated Feb. 21, 2017, 06 pages of ISRWO.

Hachisuka, et al., "Signal Transmission Modeling of the Intrabody Communication and Experimental Analyses", vol. 10, No. 6, 2007, pp. 462-468.

* cited by examiner

TRANSMISSION/RECEPTION DEVICE AND TRANSMISSION/RECEPTION METHOD

CROSS REFERENCE TO RELATED APPLICATIONS

This application is a U.S. National Phase of International Patent Application No. PCT/JP2016/085286 filed on Nov. 29, 2016, which claims priority benefit of Japanese Patent Application No. JP 2015-241795 filed in the Japan Patent Office on Dec. 11, 2015. Each of the above-referenced applications is hereby incorporated herein by reference in its entirety.

TECHNICAL FIELD

The present disclosure relates to a transmission/reception device, a transmission/reception method, and a program, and in particular relates to a transmission/reception device, a transmission/reception method, and a program capable of improving a transmission characteristic in human body communication.

BACKGROUND ART

Communication technology generally called human body communication via a human body communication network called a Body Area Network (BAN) is becoming widespread (for example, see Patent Document 1).

The BAN is a wireless network assuming that information of a sensor disposed on the surface or the inside of a human body, or the like is wirelessly collected.

CITATION LIST

Patent Document

Patent Document 1: Japanese Patent Application Laid-Open No. 2006-324774

SUMMARY OF THE INVENTION

Problems to be Solved by the Invention

By the way, an electrode configuration of a transmission/reception device used for human body communication is roughly divided into a two-pole configuration and a three-pole configuration.

In the two-pole configuration and the three-pole configuration, superiority of a transmission characteristic changes between time of transmission and time of reception.

That is, at the time of transmission, the three-pole configuration is more advantageous than the two-pole configuration, but at the time of reception, the two-pole configuration is more advantageous than the three-pole configuration.

The present disclosure has been made in view of such a situation, and in particular to improve the transmission characteristic by having a configuration advantageous in the transmission characteristic at both the time of transmission and the time of reception, in the configuration of the transmission/reception device in human body communication.

Solutions to Problems

An information processing device of an aspect of the present disclosure is a transmission/reception device including: a three-pole electrode to be used at time of transmission of a signal using a human body as a communication medium; a two-pole electrode to be used at time of reception of the signal using the human body as the communication medium; and a switching unit performing switching to cause the three-pole electrode to function at the time of transmission of the signal and to cause the two-pole electrode to function at the time of reception of the signal.

The switching unit can be caused to perform switching to cause the three-pole electrode to function and to cause the two-pole electrode not to function, at the time of transmission of the signal, and performs switching to cause the three-pole electrode not to function and to cause the two-pole electrode to function, at the time of reception of the signal.

The three-pole electrode can be made to include an electrode connected to one of transmission drivers each transmitting a signal by differential output and an electrode connected to another, and the two-pole electrode can be made to include an electrode connected to an input of an amplification unit that amplifies a signal to be received.

The three-pole electrode and the two-pole electrode can be made to include: a human body side electrode to be in contact with a human body being a communication medium; a space side electrode provided on a space side; and a circuit board Gnd having a Gnd pattern functioning as an electrode of a circuit board provided with a circuit.

The three-pole electrode can be made to independently include the human body side electrode, the space side electrode, and the circuit board Gnd, and the two-pole electrode can be made to include the human body side electrode, and an electrode in which the space side electrode and the circuit board Gnd are integrated together.

The switching unit can be made such that the switching unit switches the space side electrode and the circuit board Gnd to be in electrically contact or non-contact with each other, at the time of transmission, the switching unit brings the space side electrode and the circuit board Gnd into an electrically non-contact state to make a three-pole electrode configuration in which the human body side electrode, the space side electrode, and the circuit board Gnd are independent from each other, to cause the three-pole electrode to function, and at the time of reception, the switching unit brings the space side electrode and the circuit board Gnd into an electrically contact state to make an electrode configuration in which the space side electrode and the circuit board Gnd are integrated together, to make a configuration of the two-pole electrode, to cause the two-pole electrode to function.

A predetermined impedance can be provided between the human body side electrode and the space side electrode.

A transmission/reception method of an aspect of the present disclosure is a transmission/reception method of a transmission/reception device including: a three-pole electrode to be used at time of transmission of a signal using a human body as a communication medium; and a two-pole electrode to be used at time of reception of the signal using the human body as the communication medium, the transmission/reception method including performing switching to cause the three-pole electrode to function at the time of transmission of the signal and to cause the two-pole electrode to function at the time of reception of the signal.

A program of an aspect of the present disclosure is a program that causes a computer, the computer controlling a transmission/reception device including: a three-pole electrode to be used at time of transmission of a signal using a human body as a communication medium; and a two-pole electrode to be used at time of reception of the signal using the human body as the communication medium, to function as a switching unit performing switching to cause the three-pole electrode to function at the time of transmission of the signal and to cause the two-pole electrode to function at the time of reception of the signal.

In an aspect of the present disclosure, switching is performed such that at time of transmission of a signal using a human body as a communication medium, a three-pole electrode functions, and at time of reception of the signal using the human body as the communication medium, a two-pole electrode functions.

Effects of the Invention

According to an aspect of the present disclosure, it is possible to improve the transmission characteristic at the time of transmission and reception in human body communication.

MODE FOR CARRYING OUT THE INVENTION

Preferred embodiments of the present disclosure will be described in detail below with reference to the accompanying drawings. Incidentally, in the present specification and the drawings, constituents having substantially the same functional configuration are denoted by the same reference signs, and redundant explanations are omitted.

<Communication System Using Conventional Human Body Communication>

Figure 1:
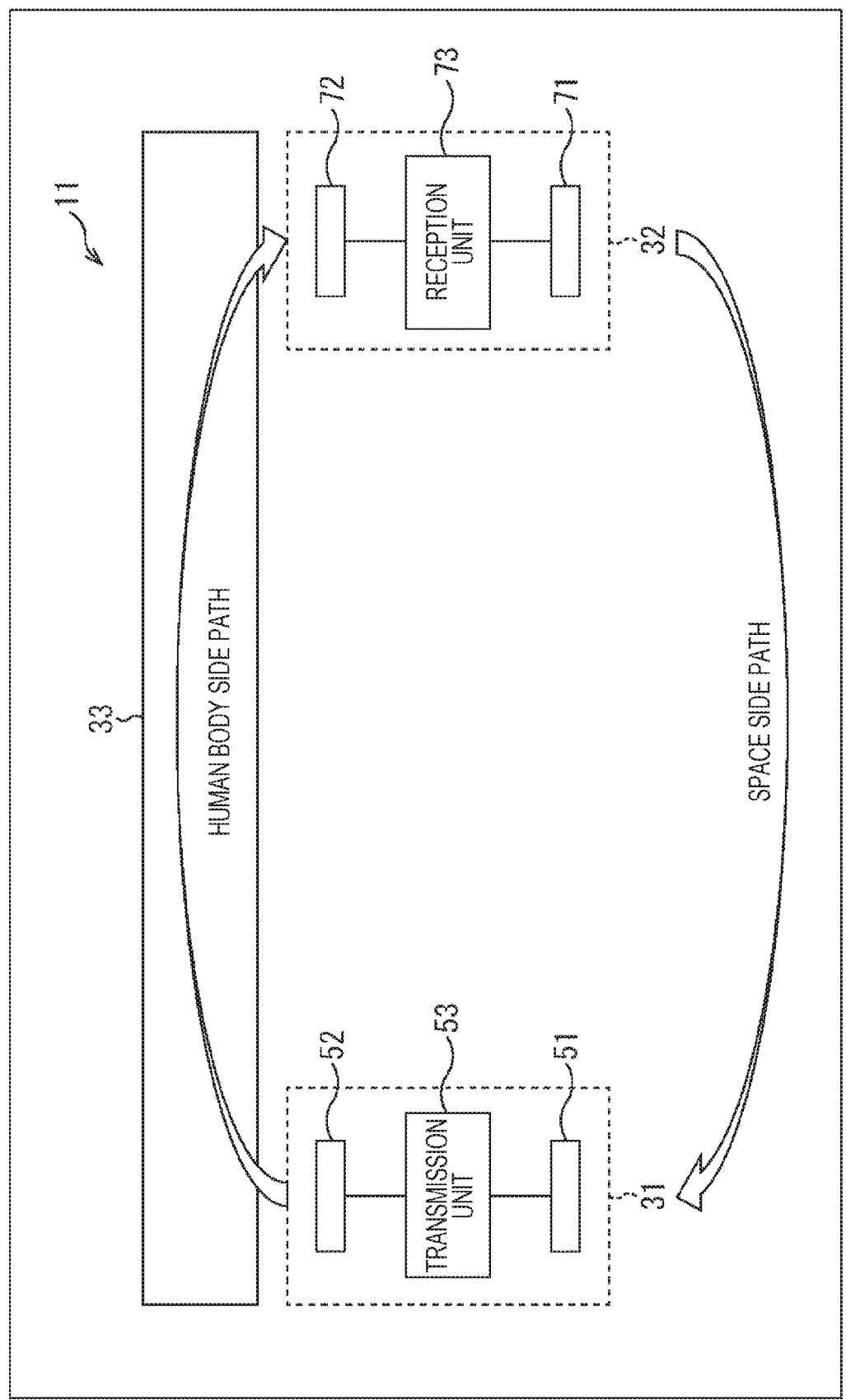
FIG. 1 is a diagram for describing a configuration of a conventional transmission/reception device.

FIG. 1 is a diagram illustrating a configuration example according to an embodiment of a communication system using human body communication to which a technique of the present disclosure is applied.

In FIG. 1, a communication system 11 is configured by a transmission device 31, a reception device 32, and a communication medium 33, and is a system in which the transmission device 31 and the reception device 32 transmit and receive signals via the communication medium 33. That is, in the communication system 11, a signal transmitted from the transmission device 31 is transmitted via the communication medium 33 and received by the reception device 32.

The transmission device 31 includes a transmission reference electrode 51, a transmission signal electrode 52, and a transmission unit 53. The transmission signal electrode 52 is one electrode of an electrode pair provided for transmitting a signal to be transmitted via the communication medium 33, and is provided such that electrostatic coupling to the communication medium 33 becomes stronger than that of the transmission reference electrode 51 that is the other electrode of the electrode pair. The transmission unit 53 is provided between the transmission signal electrode 52 and the transmission reference electrode 51, and provides an electric signal (potential difference) to be transmitted to the reception device 32 between these electrodes.

The reception device 32 includes a reception reference electrode 71, a reception signal electrode 72, and a reception unit 73. The reception signal electrode 72 is one electrode of an electrode pair provided for receiving a signal transmitted via the communication medium 33, and is provided such that electrostatic coupling to the communication medium 33 becomes stronger than that of the reception reference electrode 71 that is the other electrode of the electrode pair. The reception unit 73 is provided between the reception signal electrode 72 and the reception reference electrode 71, detects an electric signal (potential difference) generated between these electrodes by the signal transmitted via the communication medium 33, converts the electric signal into a desired electric signal, and restores the electric signal generated by the transmission unit 53 of the transmission device 31.

The communication medium 33 is configured by a substance having a physical characteristic capable of transmitting an electric signal, such as a conductor, or a dielectric. For example, the communication medium 33 is configured by a conductor typified by a metal such as copper, iron, or aluminum, a dielectric typified by pure water, rubber, glass or the like, or a living body or the like that is a composite thereof, or a material having both a property as a conductor and a property as a dielectric, like an electrolytic solution such as saline. In addition, a shape of the communication medium 33 may be any shape, and may be, for example, a linear shape, a plate shape, a spherical shape, a prismatic shape, a cylindrical shape, or the like and may be any shape other than these shapes.

With this configuration, a weak current flows to the reception signal electrode 72 of the reception device 32 from the transmission signal electrode 52 of the transmission device 31 via the human body that is the communication medium 33. A path through which this signal flows is referred to as a human body side path.

In addition, the same amount of the signal current flowing from the transmission device 31 to the reception device 32 via the human body side path returns from the reception device 32 to the transmission device 31. The electric signal is transmitted by the transmission reference electrode 51 by changing an electric field of a peripheral space, from the reception reference electrode 71 provided at a position distant from the human body that is the communication medium 33. This path is referred to as a space side path.

<Configurations of Transmission Device and Reception Device>

Figure 2:
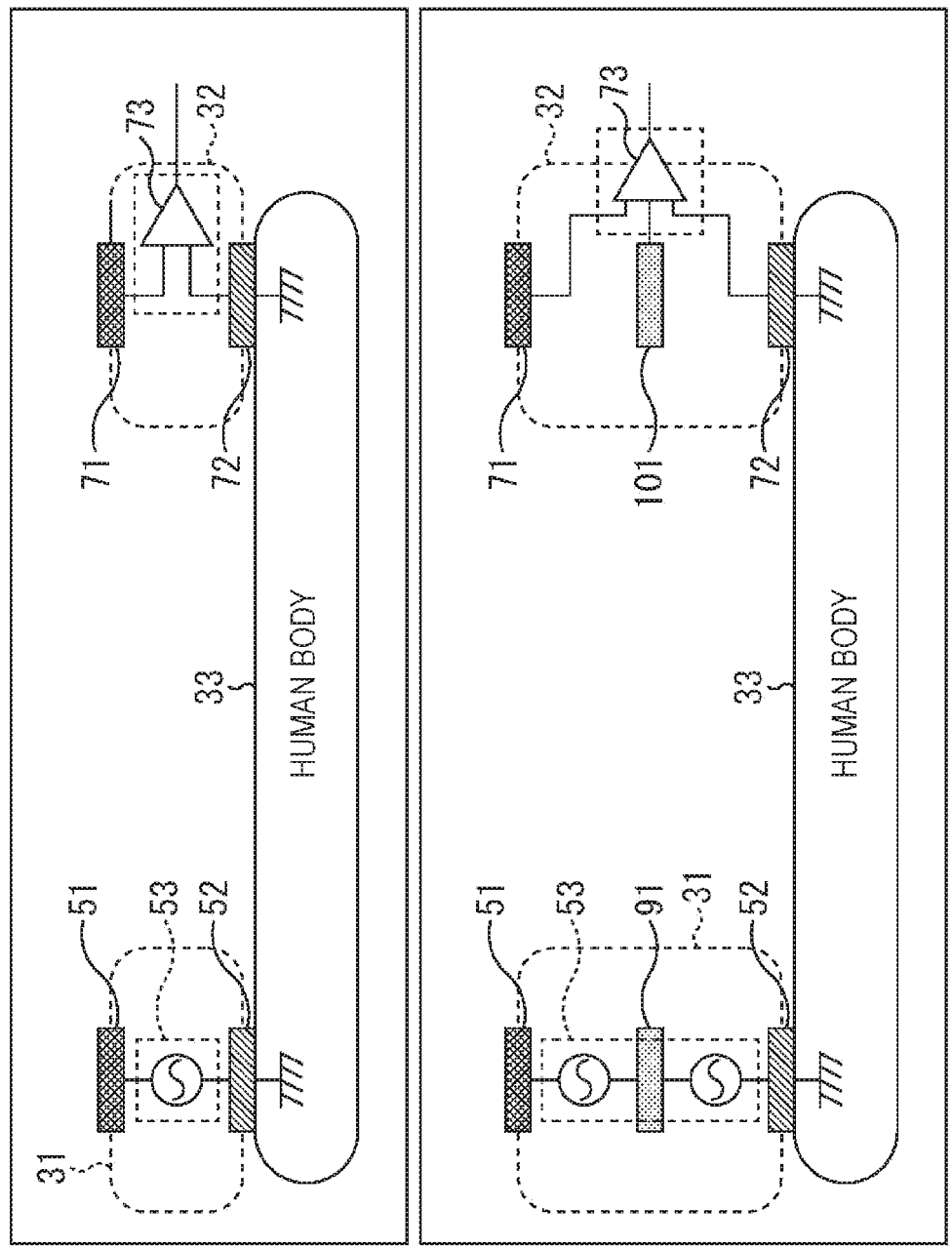
FIG. 2 is a diagram for describing a two-pole configuration and a three-pole configuration in the transmission/reception device of FIG. 1.

Roughly two kinds of configurations are devised of the transmission device 31 and the reception device 32, and one is a two-pole configuration as illustrated in the upper part of FIG. 2 and the other is a three-pole configuration as illustrated in the lower part of FIG. 2.

In the two-pole configuration, the transmission device 31 includes an electrode configuring the transmission signal electrode 52 from the transmission unit 53 that generates an electric signal, and an electrode corresponding to the transmission reference electrode 51. In addition, in the two-pole configuration, the reception device 32 includes an electrode configuring the reception signal electrode 72 from the reception unit 73 that receives an electric signal, and an electrode corresponding to the reception reference electrode 71.

On the other hand, in the three-pole configuration, the transmission device 31 includes an electrode including a circuit board 91, in addition to the electrode configuring the transmission signal electrode 52 from the transmission unit 53 that generates the electric signal, and the electrode corresponding to the transmission reference electrode 51. In addition, the reception device 32 includes an electrode including a circuit board 101, in addition to the electrode configuring the reception signal electrode 72 from the reception unit 73 that receives the electric signal, and the electrode corresponding to the reception reference electrode 71.

In the two-pole configuration and the three-pole configuration, communication characteristics are different from each other, and superiorities at the time of transmission and at the time of reception are different from each other. That is, at the time of transmission, the three-pole configuration has a more advantageous communication characteristic than the two-pole configuration, but at the time of reception, the two-pole configuration has a more advantageous communication characteristic than the three-pole configuration.

Therefore, if one of the configurations is adopted, the advantageous communication characteristic can be obtained either at the time of transmission or at the time of reception, but at the same time, the advantageous communication characteristic cannot be obtained at the other of the configurations.

<Configuration Example of Transmission/Reception Device of Present Disclosure>

Therefore, in the transmission/reception device of the present disclosure, the device operates to have the three-pole configuration at the time of transmission and operates to have the two-pole configuration at the time of reception.

Figure 3:
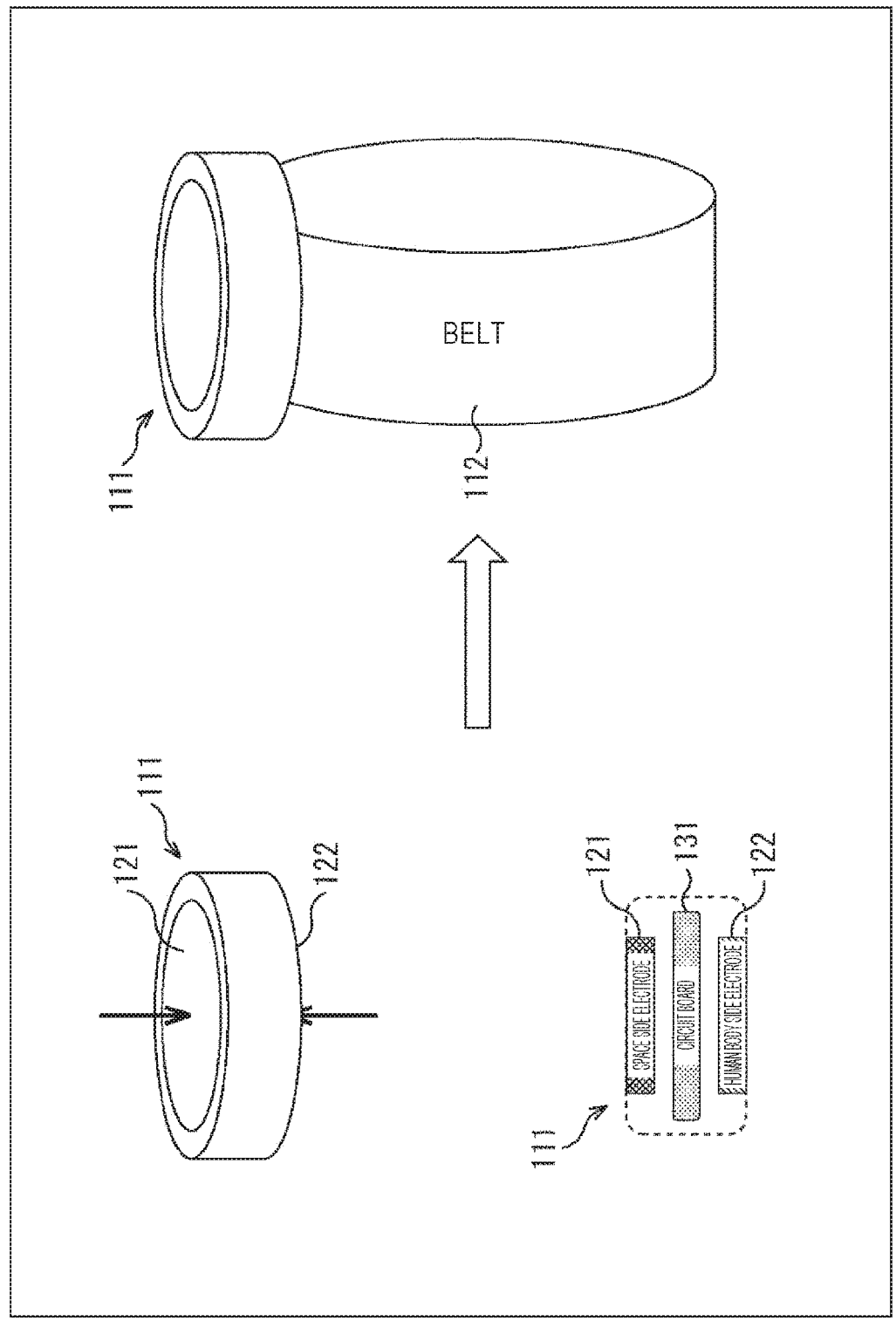
FIG. 3 is an exterior perspective view for describing an exterior of a transmission/reception device of the present disclosure.

FIG. 3 illustrates a configuration example of a transmission/reception device 111 of the present disclosure that operates to have the three-pole configuration at the time of transmission and operates to have the two-pole configuration at the time of reception.

The transmission/reception device 111 of the present disclosure has, for example, a disc-like exterior configuration, and the upper surface in the upper left part of FIG. 3 is a space side electrode 121 that is not in contact with the communication medium 33 including a human body, and the lower surface in the upper left part of FIG. 3 is a human body side electrode 122 that is in contact with the communication medium 33 including the human body.

Further, as illustrated in a schematic cross-sectional view including the lower left part of FIG. 3, a circuit board 131 is provided between the space side electrode 121 and the human body side electrode 122. Incidentally, the space side electrode 121, the human body side electrode 122, and the circuit board 131 are respectively the transmission reference electrode 51, the transmission signal electrode 52, and the circuit board 91 in the transmission device 31 of FIG. 2, and correspond to the reception reference electrode 71, the reception signal electrode 72, and the circuit board 101 in the reception device 32.

For this reason, for example, as illustrated in the right part of FIG. 3, the transmission/reception device 111 can also be caused to function as a wearable terminal mounted to the human body by being attached to a belt 112 like a wristwatch. That is, in this case, in a case where the transmission/reception device 111 is mounted using the belt 112, the human body side electrode 122 is brought into contact with an arm of the human body to which the belt 112 is mounted, and the space side electrode 121 that is the opposite side is exposed to a space.

<Detailed Configuration Example of Transmission/Reception Device>

Next, with reference to a side cross-sectional view of FIG. 4, a detailed configuration of the transmission/reception device 111 will be described.

Figure 4:
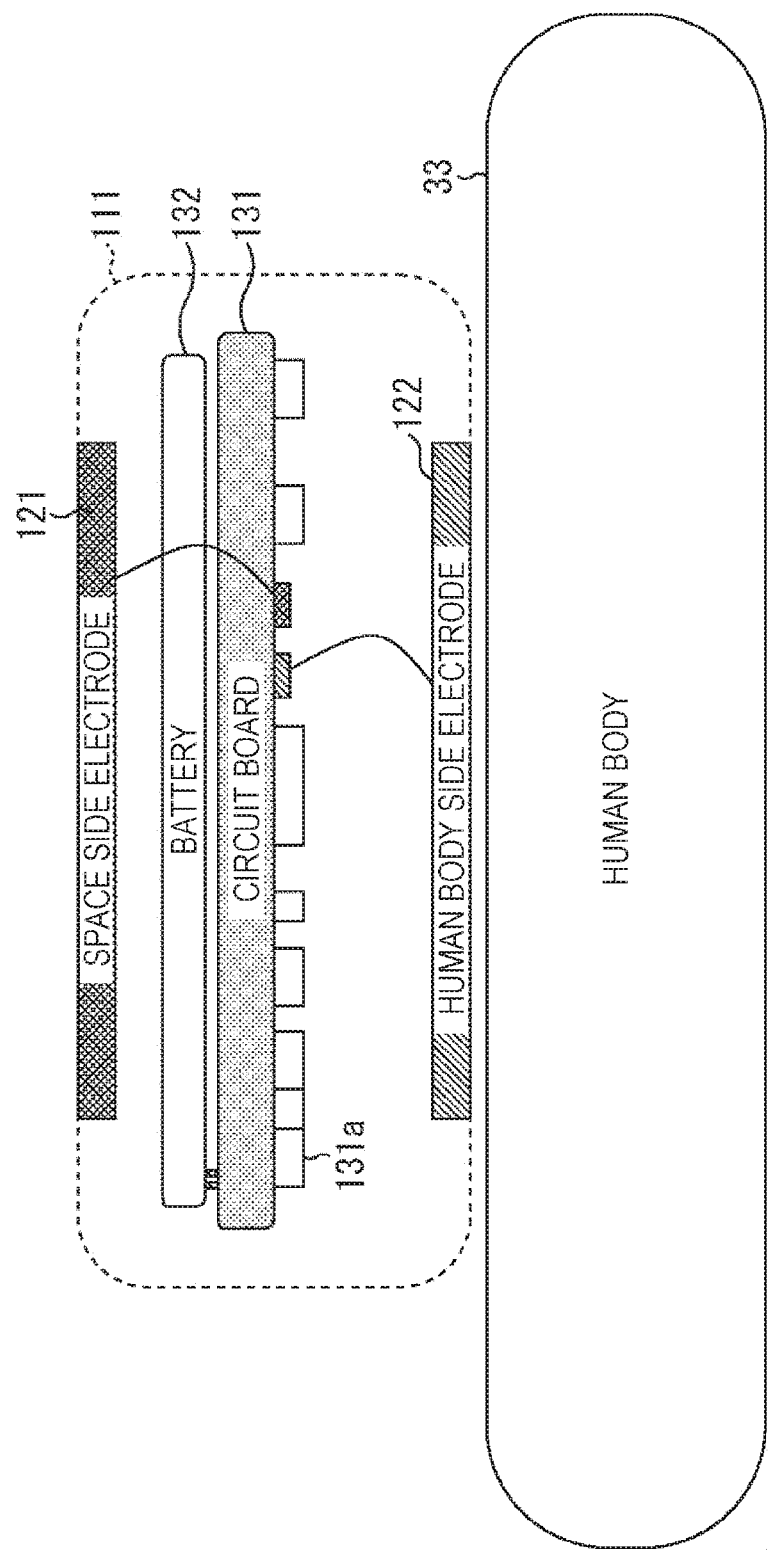
FIG. 4 is a side cross-sectional view of the transmission/reception device of FIG. 3.

In FIG. 4, the human body that is the communication medium 33 is drawn in the lower part, and a side cross section is drawn in a state where the transmission/reception device 111 is disposed on the human body.

The space side electrode 121, a battery 132, the circuit board 131, and the human body side electrode 122 are configured in this order from the top.

On the circuit board 131, various board mounting components 131a are mounted by being bonded with solder or the like. In FIG. 4, the battery 132 that supplies electric power for driving the transmission/reception device 111 is mounted on the back side of the surface of the circuit board 131 on which the board mounting components 131a are mounted (the upper side in the figure), and in FIG. 4, it is illustrated that the battery 132 is electrically connected by wiring on the left part in the figure.

In addition, the circuit board 131 is provided with constituents corresponding to the above-described transmission unit 53 and reception unit 73 by the board mounting components 131a.

Further, in the circuit board 131, the transmission unit 53 and the reception unit 73 configured by the board mounting components 131a are electrically connected to the space side electrode 121 and the human body side electrode 122 by wiring.

Incidentally, the circuit board 131 usually has a wiring surface having a multilayer structure. At least one entire surface of the wiring surface having the multilayer structure is used as Gnd, and a Gnd pattern is laid on the other surfaces, except for signal wiring. In addition, a direct current (DC) power supply is also wired with a thick line or is made into a pattern of a large area. The DC power supply is at the same potential as Gnd in terms of alternating current. Accordingly, the circuit board 131 can be regarded as an electrode having a Gnd potential in the entire surface.

Therefore, in the following, the circuit board 131 is also referred to as the circuit board electrode (circuit board Gnd) 131.

<Function Achieved by Transmission/Reception Device of FIG. 4>

With reference to a functional block diagram of FIG. 5, a function achieved by the transmission/reception device 111 of FIG. 4 will be described.

The transmission/reception device 111 includes the space side electrode 121, the human body side electrode 122, the circuit board (circuit board electrode (circuit board Gnd)) 131, an output driver 141, a reception input amplifier (Amplifier) 142, and a switch (SW) 143.

The output driver (TX) 141 uses the space side electrode 121, the human body side electrode 122, and the circuit board 131 to output a transmission signal from the space side path and the human body side path by differential output.

The reception input amplifier (RX) 142 uses the space side electrode 121, the human body side electrode 122, and the circuit board 131 to receive a reception signal from the space side path and the human body side path, and amplifies and outputs the signal.

The switch (SW) 143 electrically connects/insulates the space side electrode 121 to/from the circuit board 131. More specifically, the switch 143 is turned off at the time of transmission to insulate the space side electrode 121 from the circuit board 131, and the transmission/reception device 111 is made to have the three-pole configuration of the space side electrode 121, the human body side electrode 122, and the circuit board 131. In addition, the switch 143 is turned on at the time of reception to electrically connects the space side electrode 121 to the circuit board 131, and the transmission/reception device 111 is made to have the two-pole configuration of the human body side electrode 122 and an electrode in which the space side electrode 121 and the circuit board 131 are integrated together.

By performing switching to turn on or off the switch 143, the transmission/reception device 111 is switched to either the three-pole configuration or the two-pole configuration, and the transmission characteristic becomes superior at each of the time of transmission and the time of reception.

<Operation of Three-Pole Configuration at Time of Transmission>

Next, with reference to FIG. 6, operation of the three-pole configuration at the time of transmission will be described.

Figure 6:
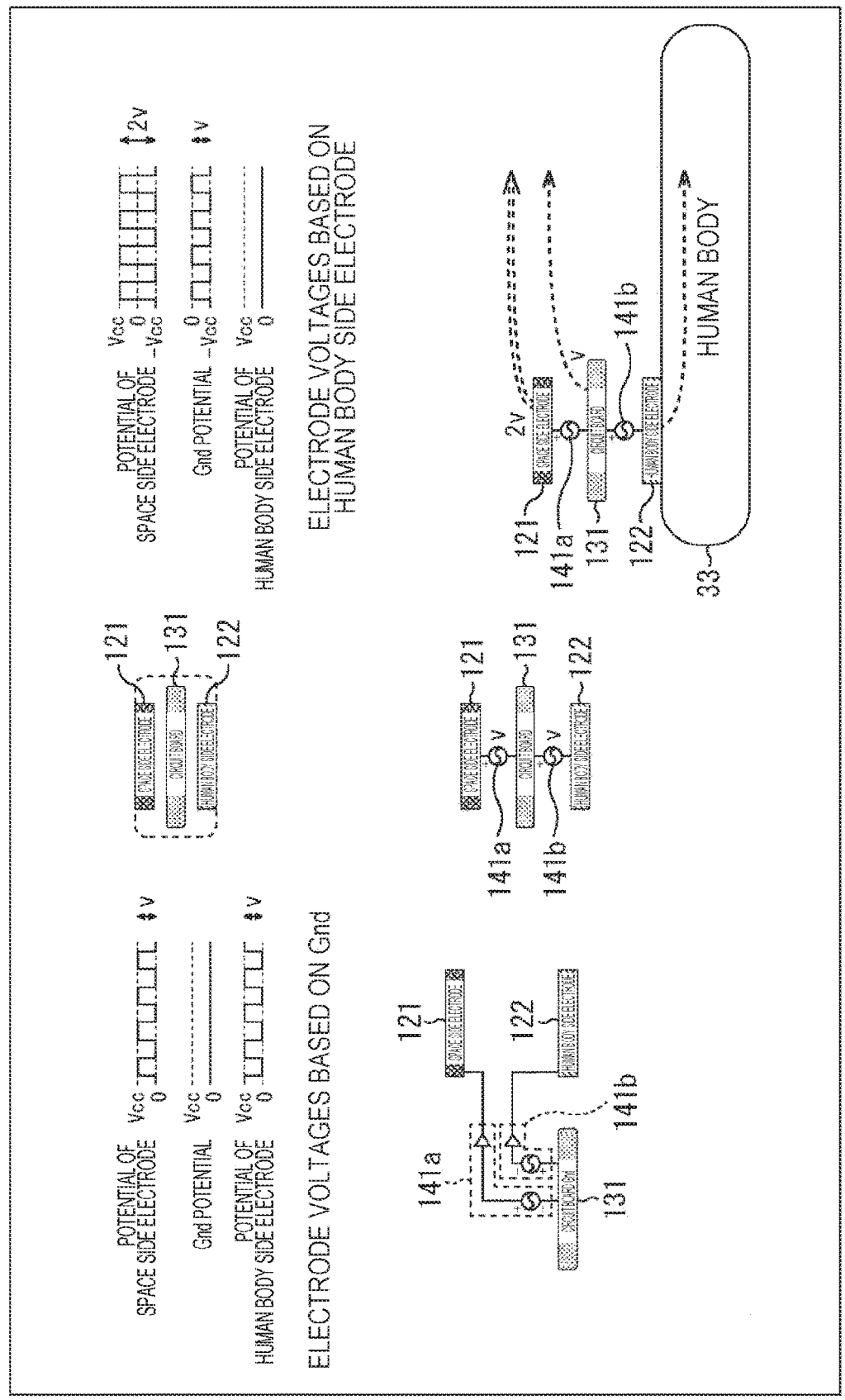
FIG. 6 is a diagram for describing operation at time of transmission of the transmission/reception device of FIG. 5.

The upper central part of FIG. 6 illustrates a side cross section in which only constituents of the space side electrode 121, the human body side electrode 122, and the circuit board 131 are extracted. In addition, the lower central part of FIG. 6 illustrates an equivalent circuit of the constituents of the upper central part of FIG. 6. That is, a transmission driver 141a is provided between the space side electrode 121 and the circuit board 131, and a transmission driver 141b is provided between the human body side electrode 122 and the circuit board 131.

As illustrated in the lower left part of FIG. 6, the transmission drivers 141a and 141b are drivers respectively having different polarities when the circuit board 131 is set to the ground Gnd. Therefore, as illustrated in the upper left part of FIG. 6, each output signal has a waveform of the same voltage v in opposite phase, and the signal becomes the differential output. Incidentally, in the upper left part of FIG. 6, a potential of the space side electrode 121, a potential of the circuit board 131 that is the ground Gnd, and a potential of the human body side electrode 122 are illustrated from the top.

Because of this configuration, when the human body side that is the transmission medium 33 is regarded as a reference voltage, the potential of the circuit board 131 and the potential of the space side electrode 121 have the same phase as illustrated in the lower right part of FIG. 6. Further, as illustrated in the upper right part of FIG. 6, the potential of the space side electrode 121 is a doubled voltage 2v as compared with the case of the upper left part of FIG. 6, and the transmission characteristic at the time of transmission becomes superior.

<Superiority Over Two-Pole Configuration of Three-Pole Configuration at Time of Transmission>

Next, superiority over the two-pole configuration of the three-pole configuration at the time of transmission will be described.

In a case where the space side electrode 121, the human body side electrode 122, and the circuit board 131 are made into the two-pole configuration, three kinds of configurations are conceivable.

Figure 7:
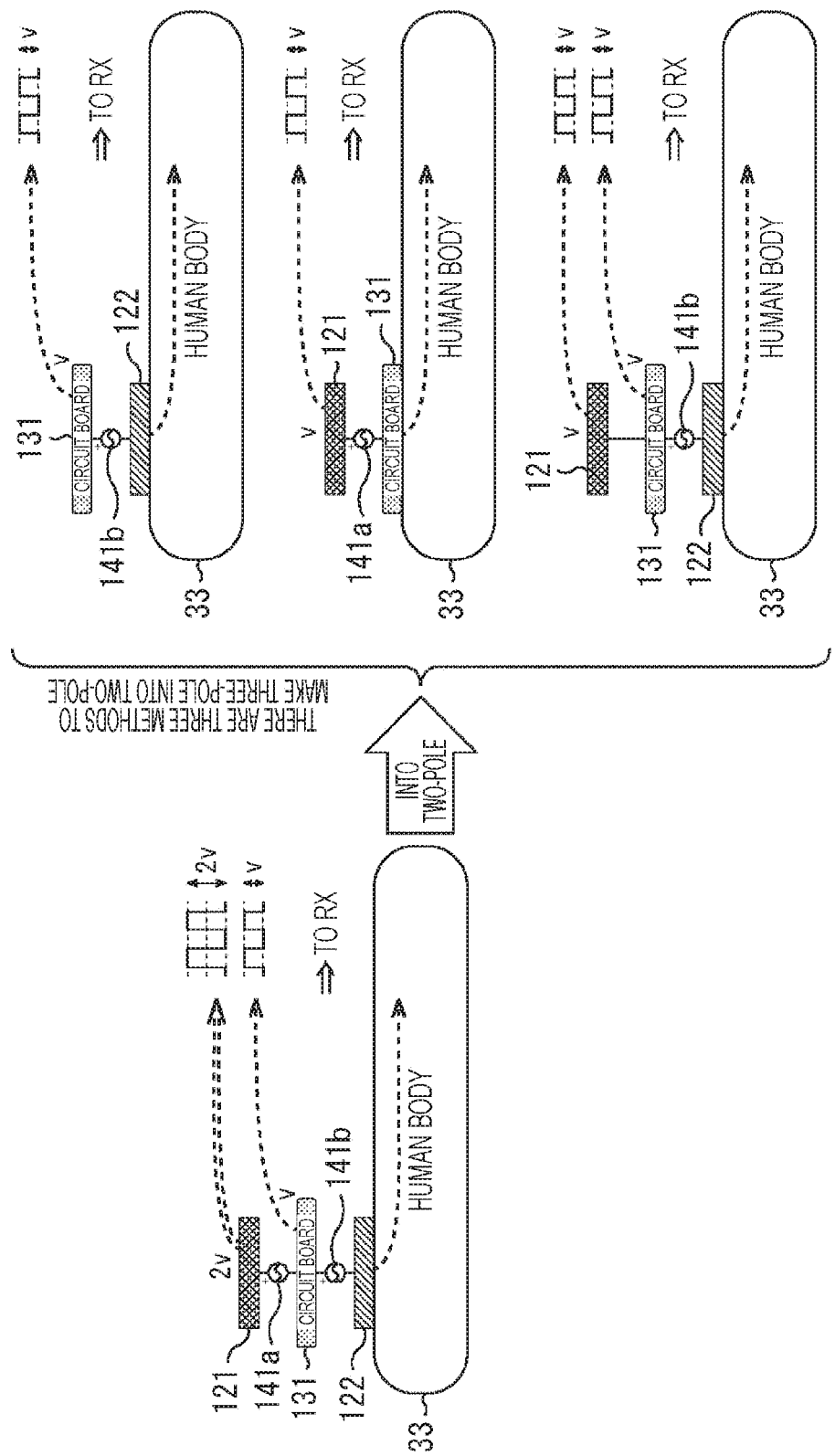
FIG. 7 is a diagram for describing superiority over a two-pole configuration of a three-pole configuration at the time of transmission in the transmission/reception device of FIG. 5.

That is, three kinds of examples are conceivable, the examples being an example of a configuration only by the circuit board 131 and the human body side electrode 122 as illustrated in the upper right part of FIG. 7, an example of a configuration only by the circuit board 131 and the space side electrode 121 as illustrated in the middle right part of FIG. 7, and an example in which the switch 143 is turned on to make one electrode in which the circuit board 131 and the space side electrode 121 are short-circuited, and further the two-pole configuration is made by the one electrode and the human body side electrode 122, as illustrated in the lower right part of FIG. 7.

However, in both the upper right part and the middle right part, an electrode area decreases and the maximum output voltage also remains at v, as compared with the three-pole configuration. In addition, in the lower right part, the electrode area is the same as the three-pole configuration, but the maximum output voltage remains at v.

Therefore, in either case, as illustrated in the left part of FIG. 7, the three-pole configuration is superior to the two-pole configuration, at the time of transmission.

<Superiority Over Three-Pole Configuration of Two-Pole Configuration at Time of Reception>

Next, superiority over the three-pole configuration of the two-pole configuration at the time of reception will be described.

Figure 8:
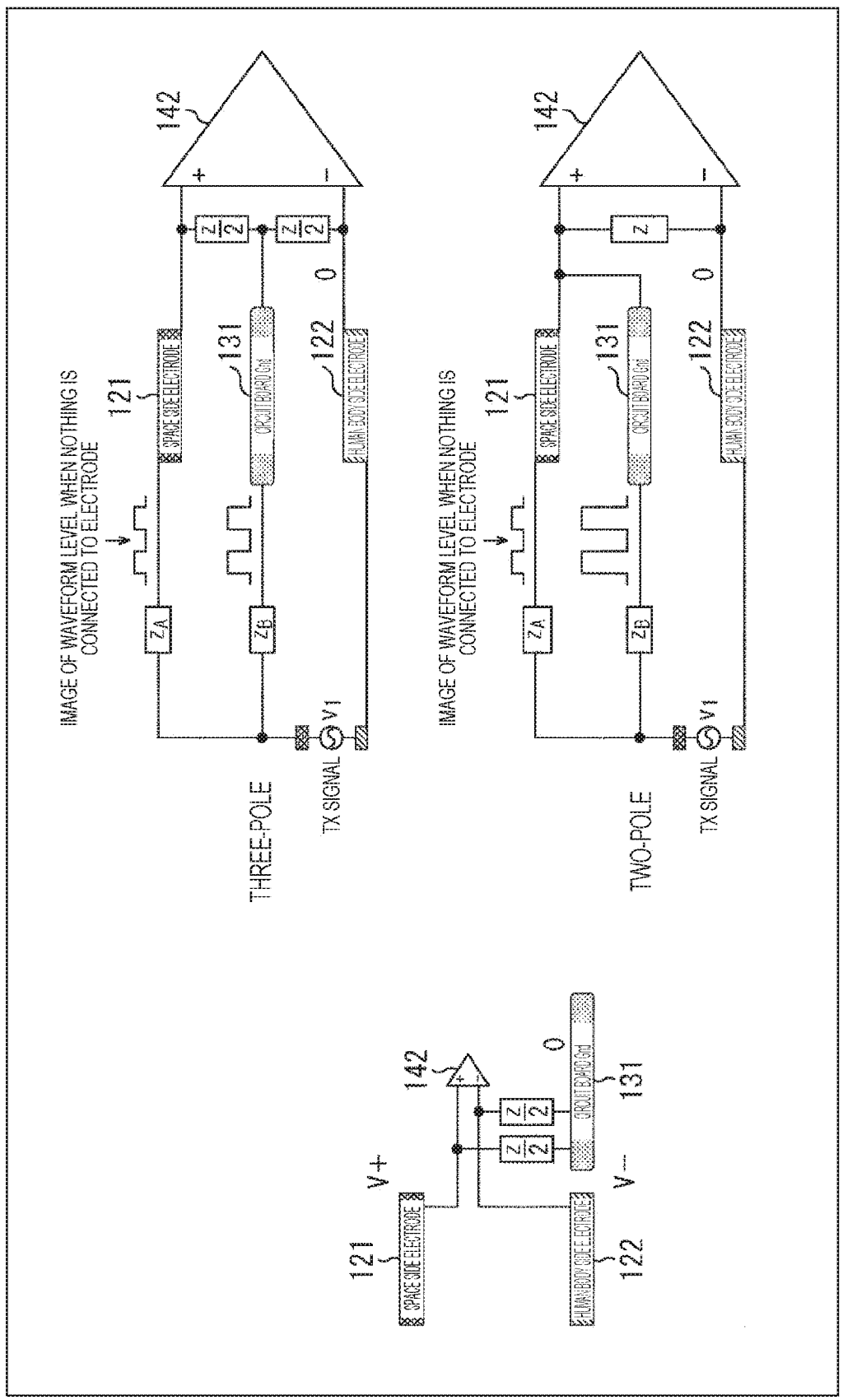
FIG. 8 is a diagram for describing superiority over the three-pole configuration of the two-pole configuration at time of reception in the transmission/reception device of FIG. 5.

As illustrated in the left part of FIG. 8, an impedance from the circuit board 131 that is the ground Gnd of the space side electrode 121 that inputs a signal to the positive input terminal of the reception input amplifier 142 and an impedance from the circuit board 131 that is the ground Gnd of the human body side electrode 122 that inputs a signal to the negative input terminal of the reception input amplifier 142 are equal (=z/2) to each other.

At this time, in a case of the three-pole configuration in which the switch 143 is turned off and the circuit board (circuit board electrode) 131 and the space side electrode 121 are independent from each other, an impedance between the circuit board 131 and the human body side electrode 122 is a half (=z/2) of an impedance between the space side electrode 121 and the human body side electrode 122.

On the other hand, in a case of the two-pole configuration in which the switch 143 is turned on and the circuit board (circuit board electrode) 131 and the space side electrode 121 are short-circuited, the impedance between the circuit board 131 and the human body side electrode 122 is the same impedance (=z) as the impedance between the space side electrode 121 and the human body side electrode 122.

An impedance of the space side path is capacitance between the transmission and reception electrodes. Since a reception signal level is determined by a ratio of an input impedance of the reception device to an impedance of the space path, by which the transmission signal is attenuated, the reception signal is increased substantially proportional to an increase in the input impedance.

With this configuration, as illustrated by a waveform (an image of a waveform level when nothing is connected to the electrode), the potential of the circuit board 131 in the two-pole configuration is twice the potential in the three-pole configuration.

As a result, an input voltage to the positive input terminal of the reception input amplifier 142 becomes higher in the two-pole configuration than in the three-pole configuration, so that reception sensitivity can be improved.

<Transmission/Reception Processing>

Figure 9:
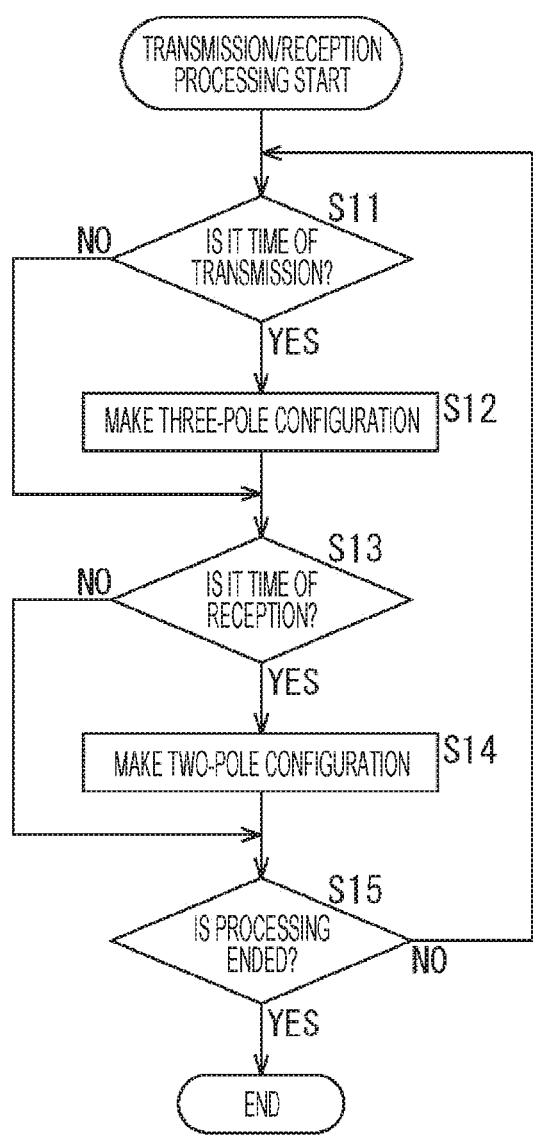
FIG. 9 is a flowchart for describing transmission/reception processing by the transmission/reception device of FIG. 5.

Next, with reference to a flowchart of FIG. 9, transmission/reception processing of the transmission/reception device 111 of FIG. 5 will be described.

In step S11, the circuit board 131 determines whether or not it is the time of transmission. In step S11, in a case where it is determined that it is the time of transmission, the processing proceeds to step S12.

In step S12, the circuit board 131 performs control to turn off the switch 143, so that the space side electrode 121 and the circuit board 131 are made to be independent electrodes, whereby the transmission/reception device 111 is caused to function as the three-pole configuration. With this operation, the transmission/reception device 111 is caused to function as the three-pole configuration having superiority at the time of transmission. With this operation, it becomes possible to cause the transmission/reception device 111 to function as the three-pole configuration having superiority at the time of transmission.

Incidentally, in step S11, in a case where it is determined that it is not the time of transmission, the processing in step S12 is skipped.

In step S13, the circuit board 131 determines whether or not it is the time of reception. In step S13, in a case where it is determined that it is the time of reception, the processing proceeds to step S14.

In step S14, the circuit board 131 performs control to turn on the switch 143, so that the space side electrode 121 and the circuit board 131 are made into an integrated electrode, whereby the transmission/reception device 111 is caused to function as the two-pole configuration. With this operation, it becomes possible to cause the transmission/reception device 111 to function as the two-pole configuration having superiority at the time of reception.

Incidentally, in step S13, in a case where it is determined that it is not the time of reception, the processing in step S14 is skipped.

In step S15, the circuit board 131 determines whether or not the processing is ended, and in a case where the processing is not ended, the processing returns to step S11 and the processing of the step S11 and subsequent steps is repeated. Then, in step S15, in a case where it is determined that the processing is ended, the processing is ended.

With the above processing, by adopting the three-pole configuration having superiority at the time of transmission, and adopting the two-pole configuration having superiority at the time of reception, it is possible to improve the transmission characteristic at each of the time of transmission and the time of reception.

<First Modification>

Figure 10:
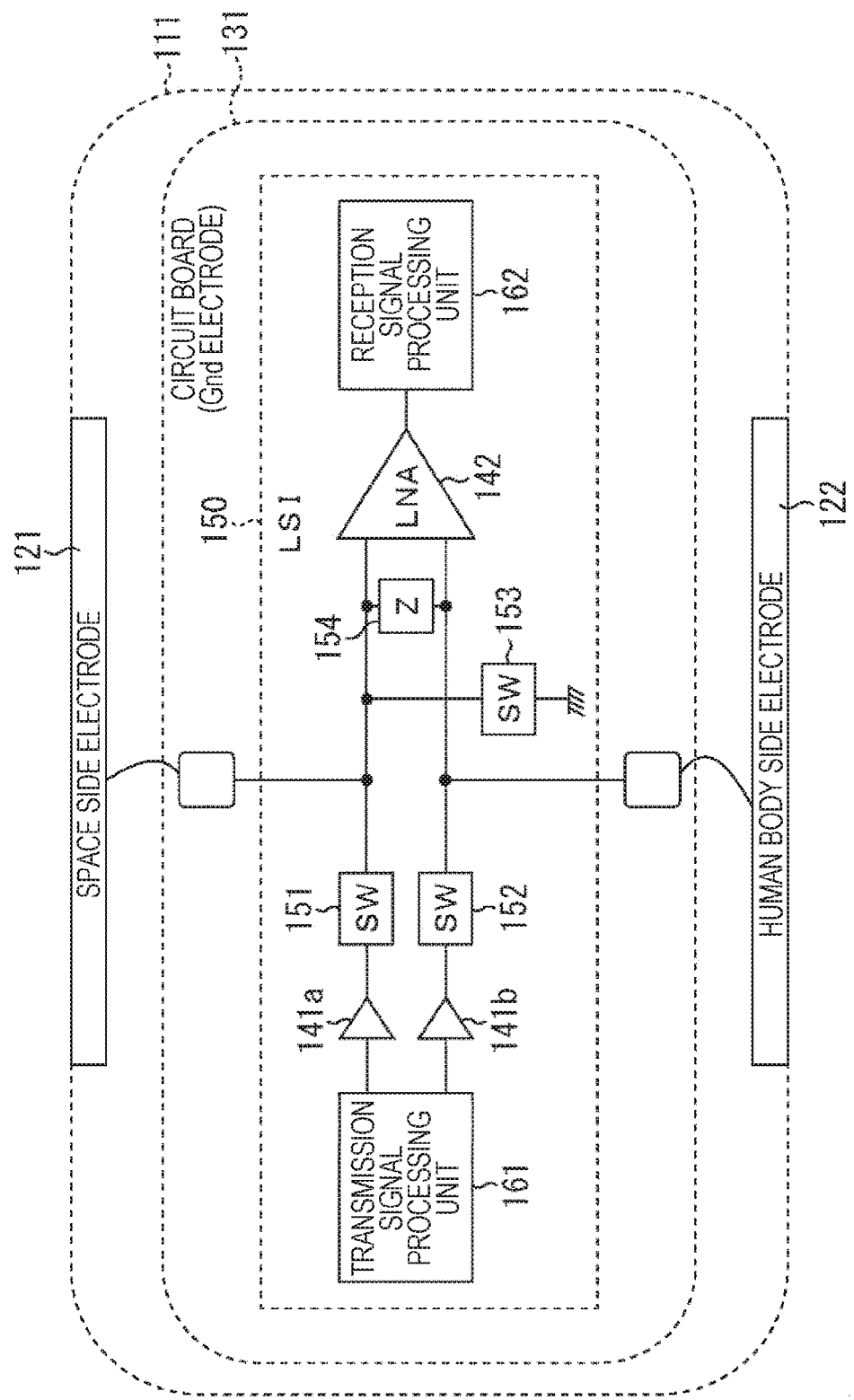
FIG. 10 is a diagram for describing a first modification of the transmission/reception device of FIG. 3.

The transmission/reception device 111 is an example of a configuration in which the two-pole configuration and the three-pole configuration can be switched by performing switching to turn on or off the switch; however, another configuration may be used as long as the configuration can perform switching between the two-pole configuration and the three-pole configuration, and for example, a configuration as illustrated in FIG. 10 may be adopted.

Figure 5:
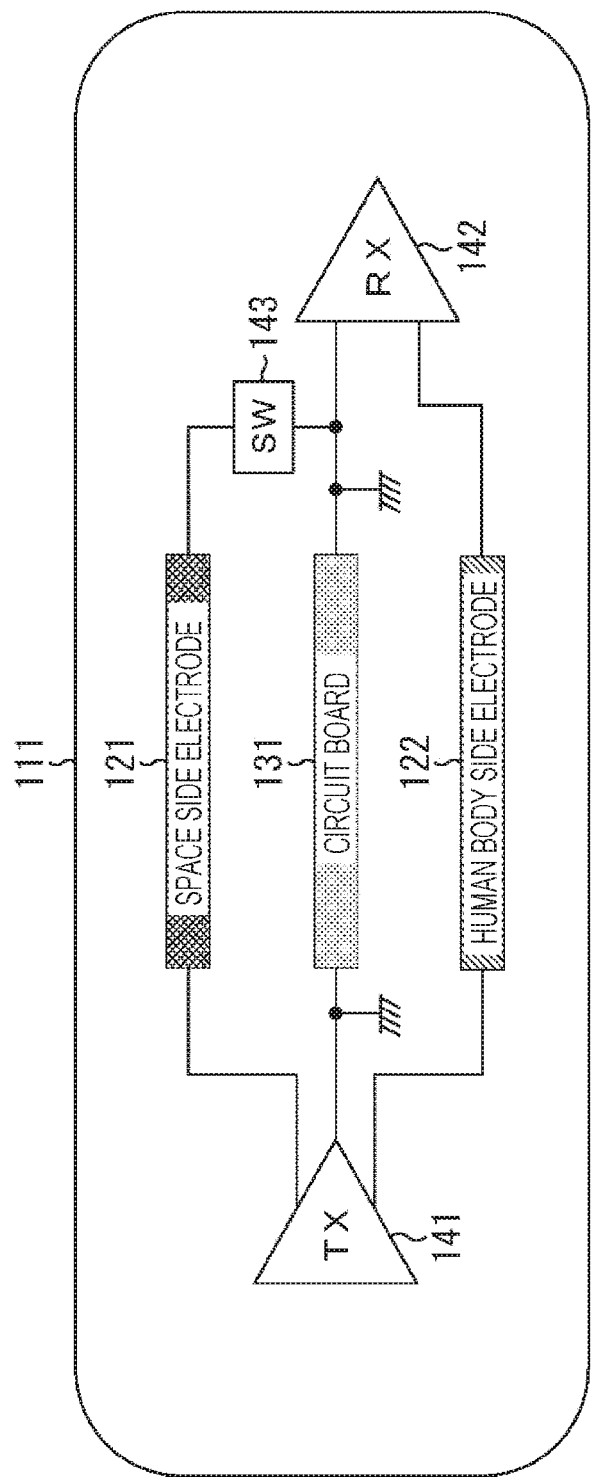
FIG. 5 is a block diagram for describing an equivalent circuit of the transmission/reception device of FIG. 3.

Incidentally, in the configuration of the transmission/reception device 111 of FIG. 10, constituents having the same functions as those of the transmission/reception device 111 of FIG. 5 are denoted by the same reference signs and the same names, and descriptions thereof will be omitted as appropriate.

That is, the circuit board 131 of FIG. 10 is configured by a Large Scale Integration (LSI) 150. The LSI 150 includes the drivers 141a and 141b, the reception input amplifier (Low Noise Amplifier (LNA)) 142, switches (SW) 151 to 153, a transmission signal processing unit 161, and a reception signal processing unit 162.

The transmission signal processing unit 161 controls the drivers 141a and 141b and the switches (SW) 151 to 153 to transmit the transmission signal in the three-pole configuration of the space side electrode 121, the circuit board 131, and the human body side electrode 122.

The switch 151 switches an electrical connection between the driver 141a and the space side electrode 121. The switch 152 switches an electrical connection between the driver 141b and the human body side electrode 122. The switch 153 switches whether or not to set the space side electrode 121 of the reception input amplifier 142 to the ground potential (GND) that is the potential of the circuit board 131.

An impedance (=z) 154 is provided between potentials of the space side electrode 121 of the reception input amplifier 142 and an input terminal of the human body side electrode 122. The reception signal processing unit 162 performs signal processing on an output signal of the reception input amplifier 142.

Figure 11:
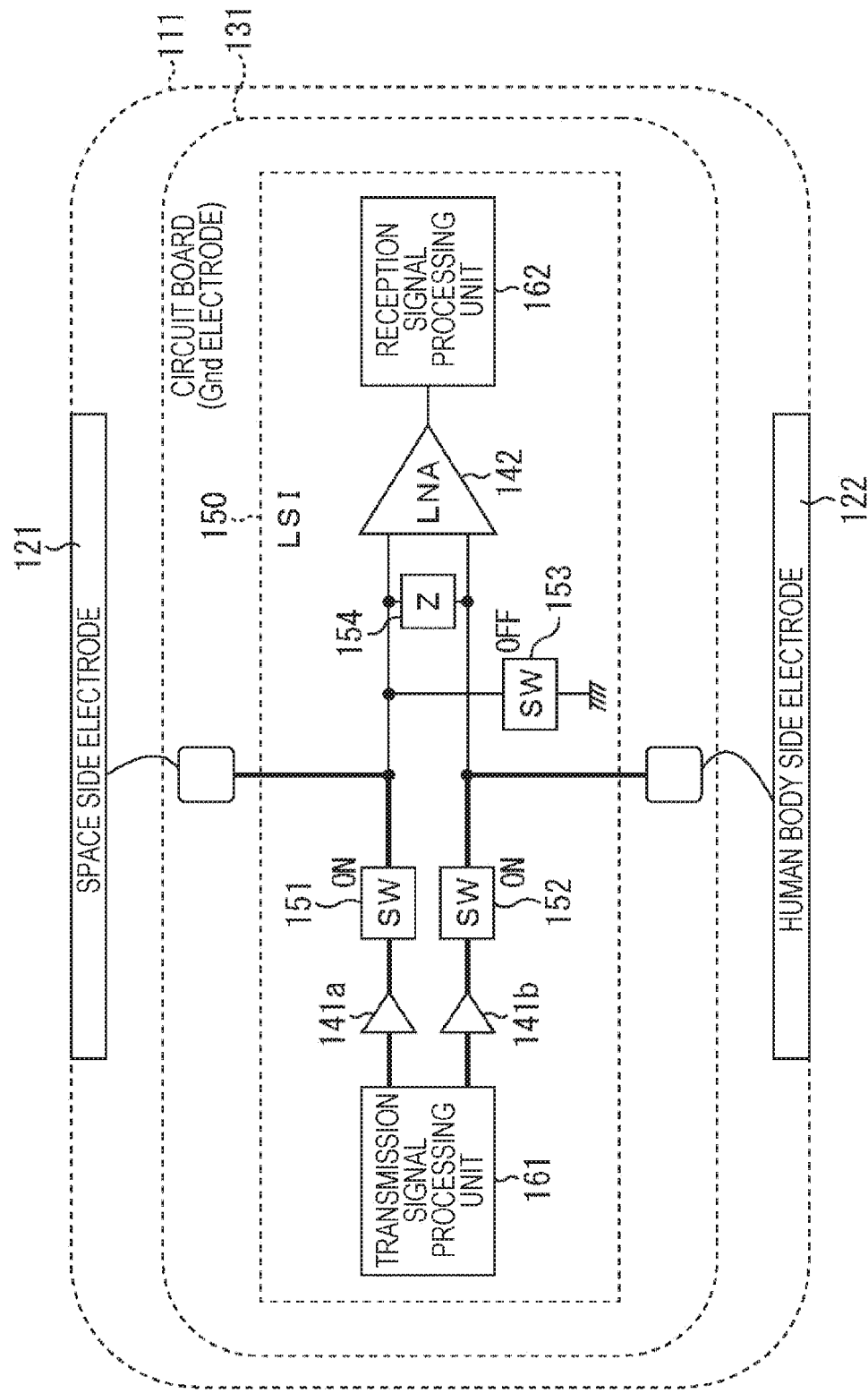
FIG. 11 is a diagram for describing operation at the time of transmission of the transmission/reception device of FIG. 10.

At the time of transmission, as illustrated in FIG. 11, the switches 151 and 152 are turned on and the switch 153 is turned off, so that a path indicated by a thick line in the figure is electrified, and the signal output from the transmission signal processing unit 161 is transmitted in the three-pole configuration including the space side electrode 121, the circuit board 131, and the human body side electrode 122.

Figure 12:
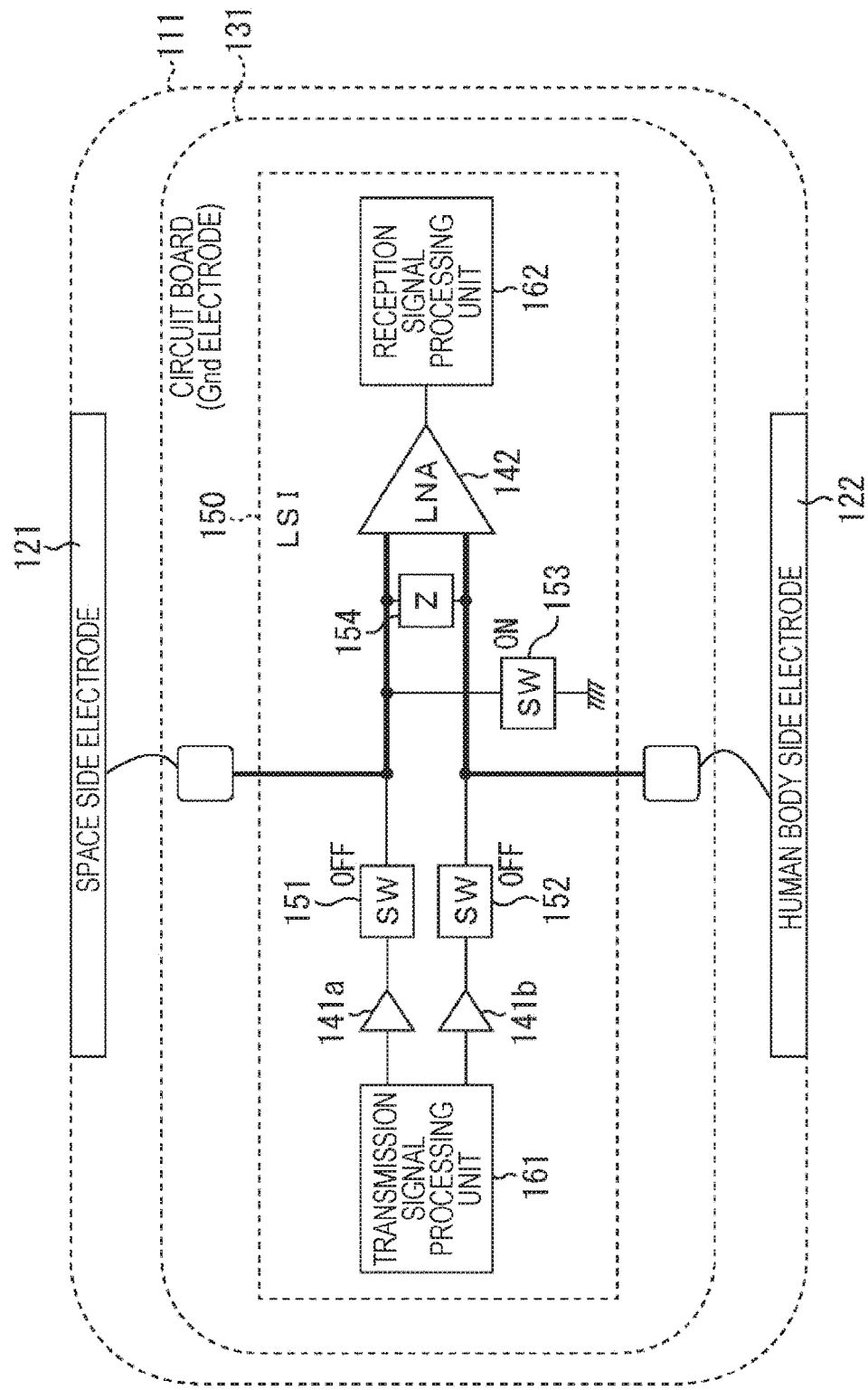
FIG. 12 is a diagram for describing operation at the time of reception of the transmission/reception device of FIG. 10.

On the other hand, at the time of reception, as illustrated in FIG. 12, the switches 151 and 152 are turned off and the switch 153 is turned on, so that a path indicated by a thick line in the figure is electrified, and the space side electrode 121 and the circuit board 131 are configured as an integrated electrode, and a signal transmitted is received in the two-pole configuration together with the human body side electrode 122, and a signal output from the reception input amplifier 142 in accordance with the reception signal is processed by the reception signal processing unit 162.

As described above, also in the transmission/reception device 111 of FIG. 10, the three-pole configuration is made at the time of transmission and the two-pole configuration is made at the time of reception, so that an enhanced transmission characteristic can be obtained at both the time of transmission and the time of reception.

Incidentally, transmission/reception processing in the transmission/reception device 111 of FIG. 10 is the same as the processing described with reference to the flowchart of FIG. 9, so that the description thereof will be omitted. However, switching between the three-pole configuration and the two-pole configuration is performed by operation of the switches 151 to 153, instead of the switch 143. That is, at the time of transmission, the switches 151 and 152 are turned on and the switch 153 is turned off to make the three-pole configuration, and at the time of reception, the switches 151 and 152 are turned off and the switch 153 is turned on to make the two-pole configuration.

<Second Modification>

Figure 13:
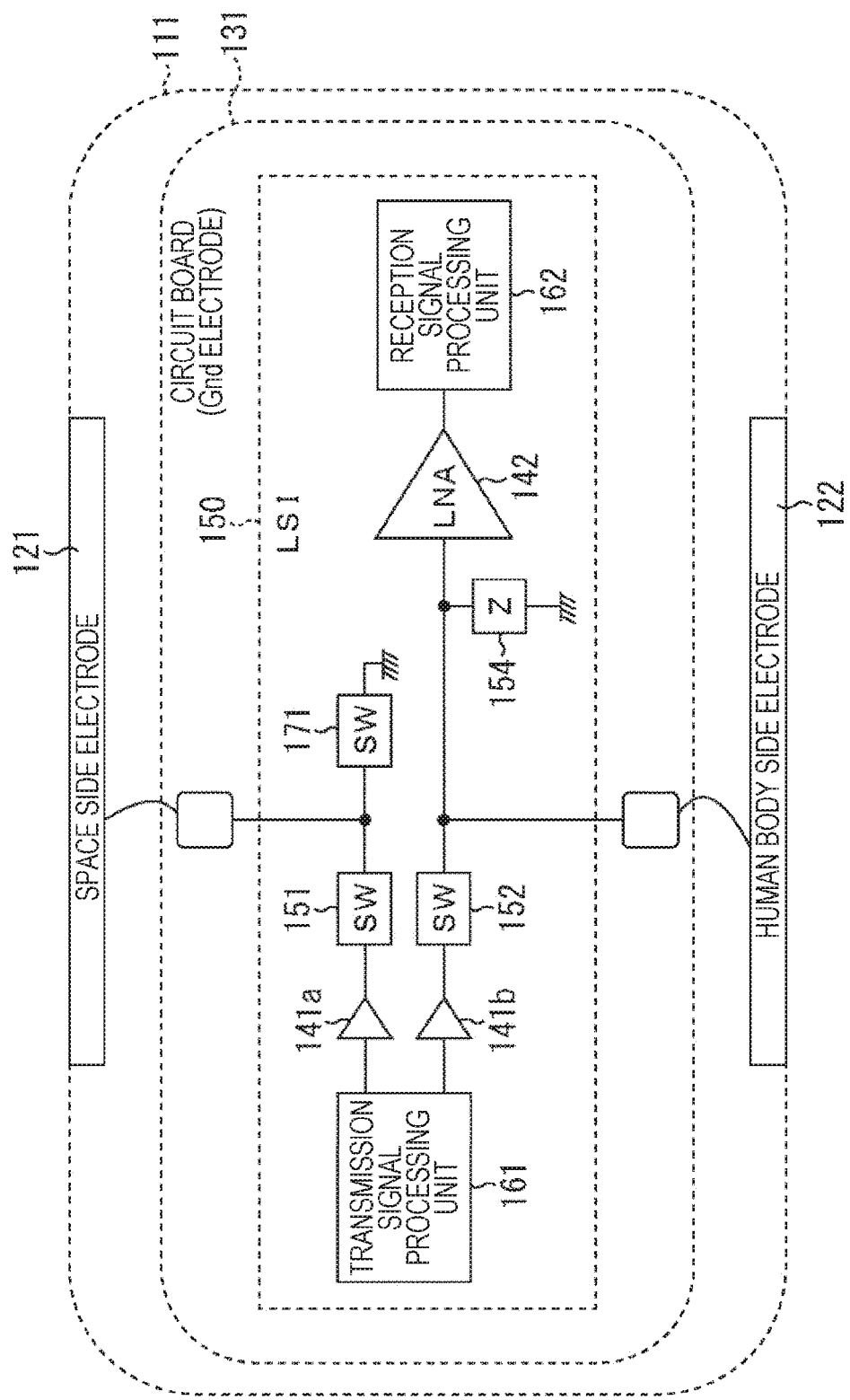
FIG. 13 is a diagram for describing a second modification of the transmission/reception device of FIG. 3.

In addition, the transmission/reception device 111 may have a configuration as illustrated in FIG. 13 below, for example.

Incidentally, in the configuration of the transmission/reception device 111 of FIG. 13, constituents having the same functions as those of the transmission/reception device 111 of FIG. 10 are denoted by the same reference signs and the same names, and descriptions thereof will be omitted as appropriate.

That is, the transmission/reception device 111 of FIG. 13 differs from the transmission/reception device 111 of FIG. 10 in that a switch 171 is provided instead of the switch 153, and the impedance (=z) 154 is provided between the input terminal from the human body side electrode 122 of the reception input amplifier 142 and the circuit board 131.

That is, the switch 171 switches whether or not to ground the space side electrode 121 onto the circuit board 131. By turning off the switches 151 and 152 and turning on the switch 171, the space side electrode 121 is grounded onto the circuit board 131, whereby the space side electrode 121 and the circuit board 131 are integrated together, and a relationship of the impedance 154 is established to the human body side electrode 122, so that the two-pole configuration is made.

Conversely, by turning off the switch 171 and turning on the switches 151 and 152, the three-pole configuration is made similarly to the transmission/reception device 111 in FIG. 10.

Figure 14:
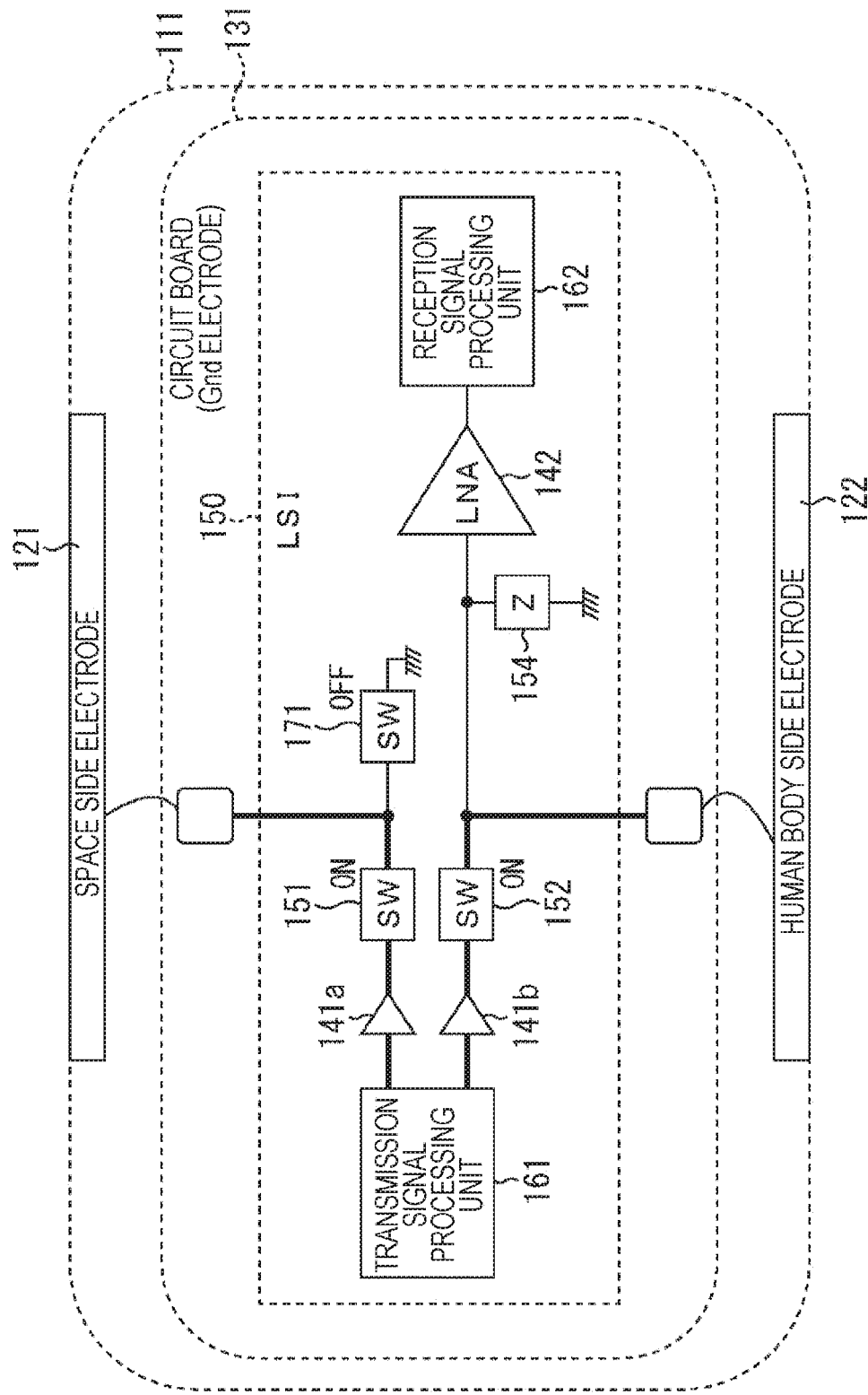
FIG. 14 is a diagram for describing operation at the time of transmission of the transmission/reception device of FIG. 13.

That is, at the time of transmission, as illustrated in FIG. 14, the switches 151 and 152 are turned on and the switch 171 is turned off, so that a path indicated by a thick line in the figure is electrified, and the signal output from the transmission signal processing unit 161 is transmitted in the three-pole configuration including the space side electrode 121, the circuit board 131, and the human body side electrode 122.

Figure 15:
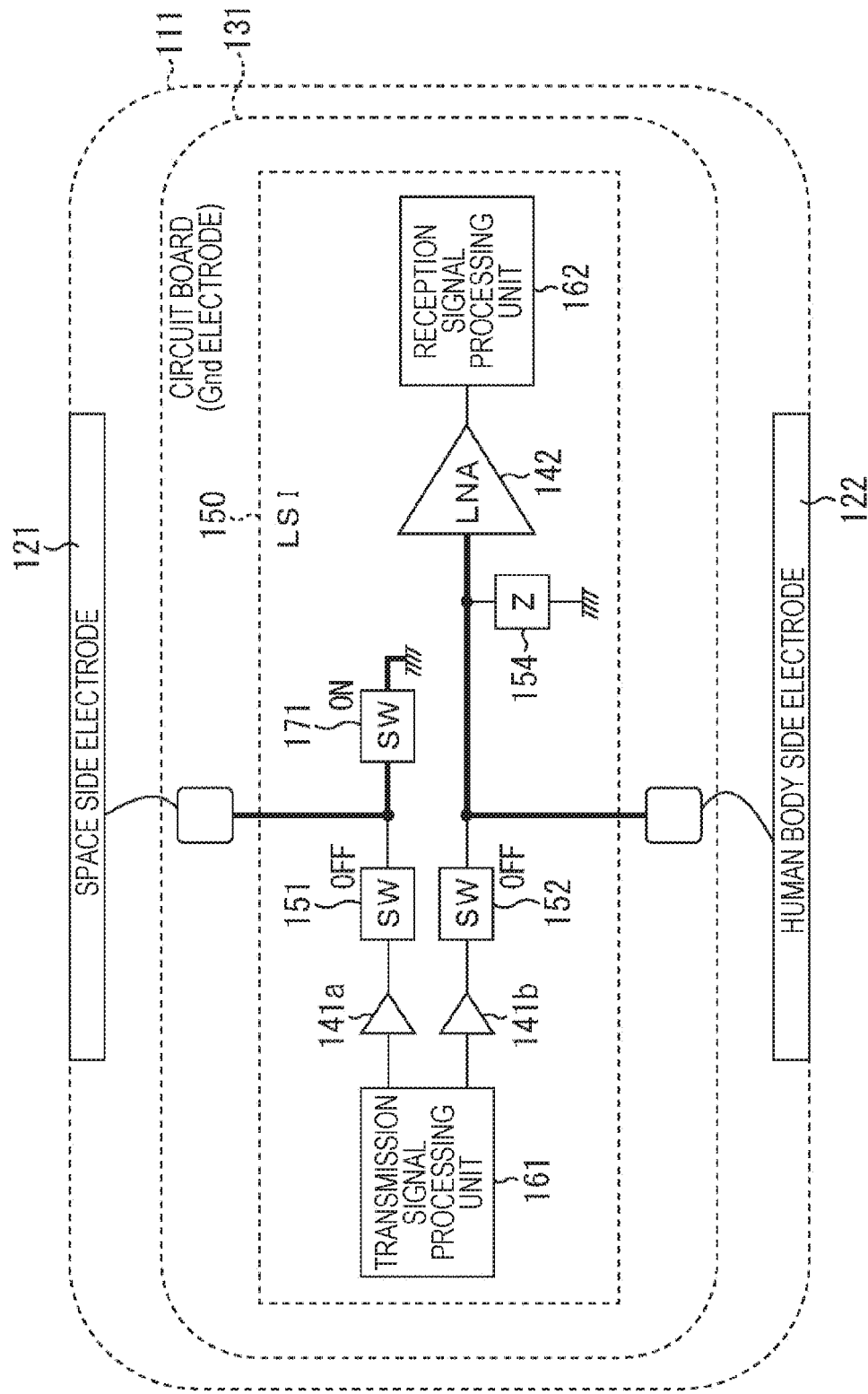
FIG. 15 is a diagram for describing operation at the time of reception of the transmission/reception device of FIG. 13.

On the other hand, at the time of reception, as illustrated in FIG. 15, the switches 151 and 152 are turned off and the switch 171 is turned on, so that a path indicated by a thick line in the figure is electrified, and the space side electrode 121 and the circuit board 131 are configured as an integrated electrode, and a signal transmitted is received in the two-pole configuration together with the human body side electrode 122, and a signal output from the reception input amplifier 142 in accordance with the reception signal is processed by the reception signal processing unit 162.

As described above, also in the transmission/reception device 111 of FIG. 13, the three-pole configuration is made at the time of transmission and the two-pole configuration is made at the time of reception, so that an enhanced transmission characteristic can be obtained at both the time of transmission and the time of reception.

Incidentally, transmission/reception processing in the transmission/reception device 111 of FIG. 13 is also the same as the processing described with reference to the flowchart of FIG. 9, so that the description thereof will be omitted. However, switching between the three-pole configuration and the two-pole configuration is performed by operation of the switches 151, 152, and 171, instead of the switch 143. That is, at the time of transmission, the switches 151 and 152 are turned on and the switch 171 is turned off to make the three-pole configuration, and at the time of reception, the switches 151 and 152 are turned off and the switch 171 is turned on to make the two-pole configuration.

In addition, in the above-described transmission/reception device 111, an example has been described of switching to one of two states, one state in which the three-pole configuration and the two-pole configuration are switched by turning on or off the switch and the transmission/reception device 111 is caused to function as the three-pole configuration and not to function as the two-pole configuration, and the other state in which the transmission/reception device 111 is caused to function as the two-pole configuration and not to function as the three-pole configuration; however, a three-pole configuration electrode and a two-pole configuration electrode may be individually configured physically, and the three-pole configuration electrode may be used at the time of transmission, and the two-pole configuration electrode may be used at the time of reception.

Further, a transmission processing block including a transmission signal processing unit and the three-pole configuration electrode, and a transmission processing block including a reception signal processing unit and the two-pole configuration electrode may be individually provided and operated at the same time.

As described above, according to the transmission/reception device in human body communication of the present disclosure, it is possible to perform transmission and reception with an enhanced transmission characteristic at the time of transmission and the time of reception.

<Example of Execution by Software>

By the way, a series of the processing described above can be executed by hardware; however, it can also be executed by software. In a case where the series of the processing is executed by the software, a program configuring the software is installed from a recording medium to a computer incorporated in dedicated hardware, or, for example, a general purpose personal computer or the like capable of executing various functions by installing various programs.

Figure 16:
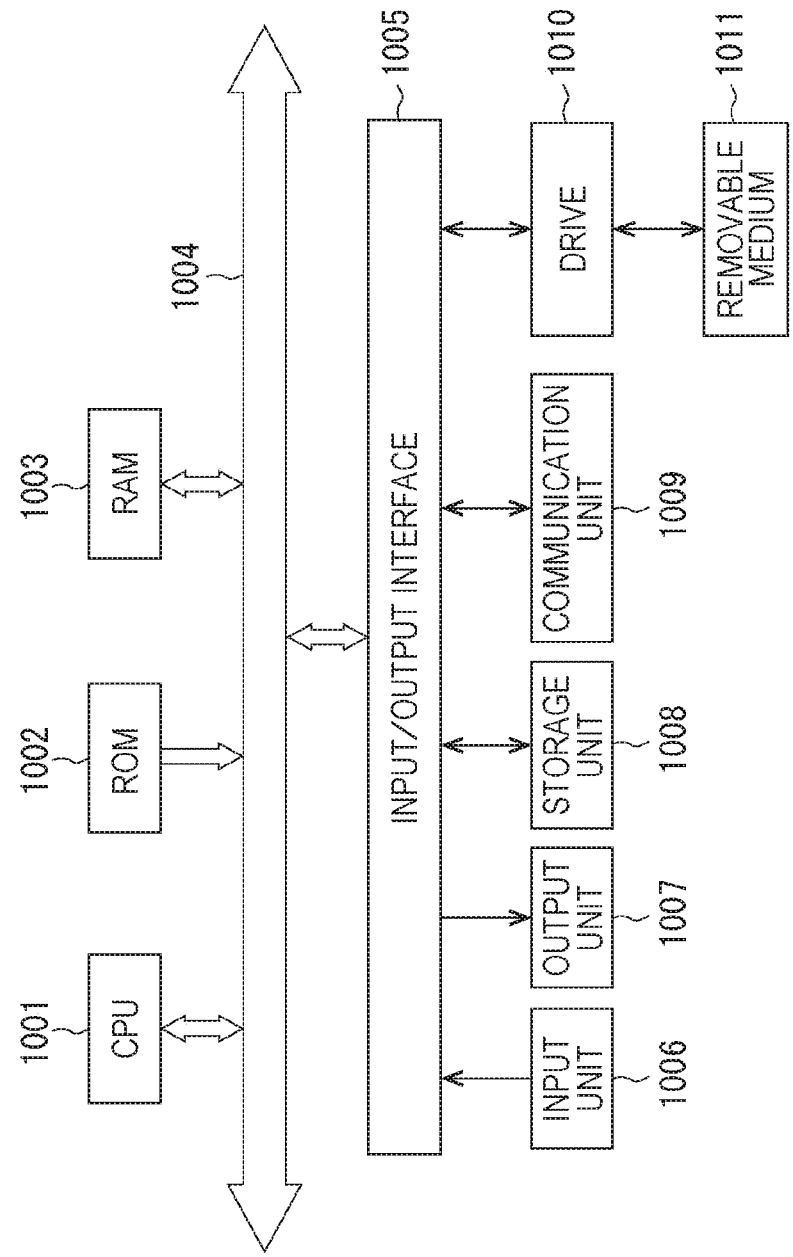
FIG. 16 is a diagram for describing a configuration example of a general purpose personal computer.

FIG. 16 illustrates a configuration example of a general purpose personal computer. The personal computer incorporates a Central Processing Unit (CPU) 1001. The CPU 1001 is connected to an input/output interface 1005 via a bus 1004. The bus 1004 is connected to Read Only Memory (ROM) 1002 and Random Access Memory (RAM) 1003.

The input/output interface 1005 is connected to an input unit 1006 including input devices such as a keyboard and a mouse for a user to input an operation command, an output unit 1007 for outputting to a display device a processing operation screen and an image of a processing result, a storage unit 1008 including a hard disk drive and the like for storing programs and various data, and a communication unit 1009 including a Local Area Network (LAN) adapter and the like for executing communication processing via a network typified by the Internet. In addition, a drive 1010 is connected for reading data from and writing data to a removable medium 1011 such as a magnetic disk (including flexible disk), an optical disk (including Compact Disc-Read Only Memory (CD-ROM) and a Digital Versatile Disc (DVD)), a magneto optical disk (including Mini Disc (MD)), or a semiconductor memory.

The CPU 1001 executes various types of processing in accordance with a program stored in the ROM 1002, or a program read from the removable medium 1011, such as the magnetic disk, the optical disk, the magneto optical disk, or the semiconductor memory, to be installed to the storage unit 1008, and loaded to the RAM 1003 from the storage unit 1008. In the RAM 1003, data necessary for the CPU 1001 to execute the various types of processing or the like is also stored appropriately.

In the computer configured as described above, for example, the CPU 1001 loads the program stored in the storage unit 1008 to the RAM 1003 via the input/output interface 1005 and the bus 1004 to execute the series of processing described above.

The program executed by the computer (CPU 1001) can be provided, for example, by being recorded in the removable medium 1011 as a package medium or the like. In addition, the program can be provided via a wired or wireless transmission medium such as a local area network, the Internet, or digital satellite broadcasting.

In the computer, the program can be installed to the storage unit 1008 via the input/output interface 1005 by mounting the removable medium 1011 to the drive 1010. In addition, the program can be installed to the storage unit 1008 by receiving with the communication unit 1009 via the wired or wireless transmission medium. Further, the program can be installed in advance to the ROM 1002 and the storage unit 1008.

Incidentally, the program executed by the computer can be a program by which the processing is performed in time series along the order described herein, and can be a program by which the processing is performed in parallel or at necessary timing such as when a call is performed.

In addition, herein, a system means an aggregation of a plurality of constituents (apparatus, module (component), and the like), and it does not matter whether or not all of the constituents are in the same cabinet. Therefore, a plurality of apparatuses that is accommodated in a separate cabinet and connected to each other via a network and one apparatus that accommodates a plurality of modules in one cabinet are both systems.

Incidentally, the embodiment of the present disclosure is not limited to the embodiments described above, and various modifications are possible without departing from the scope of the present disclosure.

For example, the present disclosure can adopt a configuration of cloud computing that shares one function in a plurality of apparatuses via a network to process in cooperation.

In addition, each step described in the above flowchart can be executed by sharing in a plurality of apparatuses, other than being executed by one apparatus.

Further, in a case where a plurality of pieces of processing is included in one step, the plurality of pieces of processing included in the one step can be executed by sharing in a plurality of apparatuses, other than being executed by one apparatus.

Incidentally, the present disclosure can also adopt the following configurations.

<1> A transmission/reception device including:
a three-pole electrode to be used at time of transmission of a signal using a human body as a communication medium;
a two-pole electrode to be used at time of reception of the signal using the human body as the communication medium; and
a switching unit performing switching to cause the three-pole electrode to function at the time of transmission of the signal and to cause the two-pole electrode to function at the time of reception of the signal.

<2> The transmission/reception device according to <1>, in which
the switching unit performs switching to cause the three-pole electrode to function and to cause the two-pole electrode not to function, at the time of transmission of the signal, and performs switching to cause the three-pole electrode not to function and to cause the two-pole electrode to function, at the time of reception of the signal.

<3> The transmission/reception device according to <1>, in which
the three-pole electrode includes an electrode connected to one of transmission drivers each transmitting a signal by differential output and an electrode connected to another, and
the two-pole electrode includes an electrode connected to an input of an amplification unit that amplifies a signal to be received.

<4> The transmission/reception device according to <1>, in which
the three-pole electrode and the two-pole electrode include:
a human body side electrode to be in contact with a human body being a communication medium;
a space side electrode provided on a space side; and
a circuit board Gnd having a Gnd pattern functioning as an electrode of a circuit board provided with a circuit.

<5> The transmission/reception device according to <4>, in which
the three-pole electrode independently includes the human body side electrode, the space side electrode, and the circuit board Gnd, and
the two-pole electrode includes the human body side electrode, and an electrode in which the space side electrode and the circuit board Gnd are integrated together.

<6> The transmission/reception device according to <5>, in which
the switching unit switches the space side electrode and the circuit board Gnd to be in electrically contact or non-contact with each other,
at the time of transmission, the switching unit brings the space side electrode and the circuit board Gnd into an electrically non-contact state to make a three-pole electrode configuration in which the human body side electrode, the space side electrode, and the circuit board Gnd are independent from each other, to cause the three-pole electrode to function, and
at the time of reception, the switching unit brings the space side electrode and the circuit board Gnd into an electrically contact state to make an electrode configuration in which the space side electrode and the circuit board Gnd are integrated together, to make a configuration of the two-pole electrode, to cause the two-pole electrode to function.

<7> The transmission/reception device according to <4>, in which
a predetermined impedance is provided between the human body side electrode and the space side electrode.

<8> A transmission/reception method of a transmission/reception device including:
a three-pole electrode to be used at time of transmission of a signal using a human body as a communication medium; and
a two-pole electrode to be used at time of reception of the signal using the human body as the communication medium,
the transmission/reception method including
performing switching to cause the three-pole electrode to function at the time of transmission of the signal and to cause the two-pole electrode to function at the time of reception of the signal.

<9> A program that causes a computer,
the computer controlling a transmission/reception device including:
a three-pole electrode to be used at time of transmission of a signal using a human body as a communication medium; and
a two-pole electrode to be used at time of reception of the signal using the human body as the communication medium,
to function as a switching unit performing switching to cause the three-pole electrode to function at the time of transmission of the signal and to cause the two-pole electrode to function at the time of reception of the signal.

REFERENCE SIGNS LIST

33 Communication medium (human body)
111 Transmission/reception device
112 Belt
121 Space side electrode
122 Human body side electrode
131 Circuit board
132 Battery
141, 141a, 141b Output driver
142 Reception input amplifier
143 Switch
151 to 153 Switch
154 Impedance
161 Transmission signal processing unit
162 Reception signal processing unit
171 Switch

The invention claimed is:
1. A transmission/reception device, comprising:
a three-pole electrode configured to transmit a signal via a communication medium;
a two-pole electrode configured to receive the signal via the communication medium,
wherein the communication medium is a human body,
wherein the three-pole electrode and the two-pole electrode include:
a human body side electrode that is in contact with the human body;
a space side electrode that is on a space side; and
a circuit board Gnd that has a Gnd pattern which functions as an electrode of the circuit board Gnd, wherein the circuit board Gnd comprises a circuit; and
a switching unit configured to switch the transmission/reception device to function as:
the three-pole electrode at a time of transmission of the signal, and
the two-pole electrode at a time of reception of the signal.
2. The transmission/reception device according to claim 1, wherein
the switching unit is further configured to:
control the transmission/reception device to function as the three-pole electrode and to restrict the function of the transmission/reception device as the two-pole electrode, at the time of transmission of the signal, and
control the transmission/reception device to function as the two-pole electrode and to restrict the function of the transmission/reception device as the three-pole electrode, at the time of reception of the signal.

3. The transmission/reception device according to claim 1, wherein
the three-pole electrode is connected to a plurality of transmission drivers,
wherein each of the plurality of transmission drivers transmits the signal by differential output, and
the two-pole electrode an amplification unit that receives the signal and amplifies the received signal.
4. The transmission/reception device according to claim 1, wherein
the three-pole electrode independently includes the human body side electrode, the space side electrode, and the circuit board Gnd, and
the two-pole electrode includes the human body side electrode, and a first electrode,
wherein the space side electrode and the circuit board Gnd are integrated in the first electrode.
5. The transmission/reception device according to claim 4, wherein
the switching unit is further configured to switch the space side electrode to electrically one of contact or non-contact the circuit board Gnd,
at the time of transmission, the switching unit is further configured to bring the space side electrode and the circuit board Gnd into an electrically non-contact state to make a three-pole electrode configuration in which the human body side electrode, the space side electrode, and the circuit board Gnd are independent from each other, to control the transmission/reception device to function as the three-pole electrode, and
at the time of reception, the switching unit is further configured to bring the space side electrode and the circuit board Gnd into an electrically contact state to make a two-pole electrode configuration in which the space side electrode and the circuit board Gnd are integrated, to control the transmission/reception device to function as the two-pole electrode.
6. The transmission/reception device according to claim 1, wherein
an impedance is provided between the human body side electrode and the space side electrode.
7. A transmission/reception method, comprising:
switching a transmission/reception device to function as:
a three-pole electrode at a time of transmission of a signal;
wherein the three-pole electrode is configured to transmit the signal via a communication medium; and
a two-pole electrode at a time of reception of the signal,
wherein the two-pole electrode is configured to receive the signal via the communication medium,
wherein the communication medium is a human body, and
wherein the three-pole electrode and the two-pole electrode include:
a human body side electrode that is in contact with the human body;
a space side electrode that is on a space side; and
a circuit board Gnd that has a Gnd pattern which functions as an electrode of the circuit board Gnd,
wherein the circuit board Gnd comprises a circuit.
8. A non-transitory computer-readable medium having stored thereon computer-executable instructions, which when executed by at least one processor, cause the at least one processor to execute operations, the operations comprising:
    switching a transmission/reception device to function as:
        a three-pole electrode at a time of transmission of a signal,
            wherein the three-pole electrode is configured to transmit the signal via a communication medium; and
        a two-pole electrode at a time of reception of the signal,
            wherein the two-pole electrode is configured to receive the signal via the communication medium,
            wherein the communication medium is a human body, and
            wherein the three-pole electrode and the two-pole electrode include:
                a human body side electrode that is in contact with the human body;
                a space side electrode that is on a space side; and
                a circuit board Gnd that has a Gnd pattern which functions as an electrode of the circuit board Gnd,
                    wherein the circuit board Gnd comprises a circuit.

* * * * *